United States Patent
Oblizajek et al.

(10) Patent No.: US 7,926,338 B2
(45) Date of Patent: Apr. 19, 2011

(54) METHOD FOR DETECTING LOCAL RUNOUT OF A TIRE

(75) Inventors: Kenneth L. Oblizajek, Troy, MI (US); John D. Sopoci, Commerce Township, MI (US); Carl T. Wright, Highland, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 87 days.

(21) Appl. No.: 12/539,826

(22) Filed: Aug. 12, 2009

(65) Prior Publication Data

US 2011/0036158 A1    Feb. 17, 2011

(51) Int. Cl.
*G01M 17/02* (2006.01)
(52) U.S. Cl. .......................................................... 73/146
(58) Field of Classification Search .................. None
See application file for complete search history.

(56) References Cited

U.S. PATENT DOCUMENTS

| | | | | |
|---|---|---|---|---|
| 4,311,044 A | * | 1/1982 | Marshall et al. | 73/146 |
| 6,739,186 B1 | * | 5/2004 | Schartz et al. | 73/146 |

FOREIGN PATENT DOCUMENTS

| | | | |
|---|---|---|---|
| JP | 01314935 A | * | 12/1989 |
| JP | 07243947 A | * | 9/1995 |
| JP | 2009031034 A | * | 2/2009 |

* cited by examiner

*Primary Examiner* — Andre J Allen (57) ABSTRACT

A raw runout signal of a tire is bandpass filtered utilizing appropriate, empirically determined, low and high tire order corners to determine the bandpass of the bandpass filter. A band-limited runout signal is then obtained and is examined for characteristic signal patterns of local runout which are known to exhibit periodically modulated cabin interior sound during vehicle movement, usually driving conditions involving highway speeds and smooth roads, which is audibly detectable by passengers based upon, for example, empirical analysis wherein the maximum gain of the bandpass filter is, preferably, unity.

20 Claims, 5 Drawing Sheets

METHOD FOR DETECTING LOCAL RUNOUT OF A TIRE

TECHNICAL FIELD

The present invention relates to runout detection of motor vehicle tires, particularly local runout producing periodically modulated cabin interior sound during vehicle movement which is audibly detectable by passengers.

BACKGROUND OF THE INVENTION

Pneumatic tires used for motor vehicles are tested for peripheral irregularity of the tire tread region of the tire, known as "runout". Runout can take two basic forms, based chiefly on the character of the peripheral irregularity: 1) "non-local" runout caused by gross irregularities, which occur over large tread regions out of round with the rest of the tire tread and may, if significant enough, produce relatively low frequency ride vibrations (e.g., between 5 and 30 Hz), and the like; and 2) "local" runout caused by sharp irregularities, which are observed at tread regions that are locally elevated or depressed with respect to the adjacent tire tread. If significant enough, these sharp irregularities produce periodically modulated cabin interior sound (e.g., above 100 Hz) during vehicle movement, usually on a smooth road at highway speeds (e.g., above about 40 MPH), and is audibly detectable by passengers. This sound is commonly perceived as a thumping sound and is referred to as "helicopter noise" due to its perceived similarity to the sound of a distant helicopter.

Each tire tested is either accepted (passed) or not accepted (not passed) based upon the detection of the runout and predetermined criteria for the acceptance or non-acceptance of the tire with respect to predetermined characteristics of the detected runout.

Figure 1:
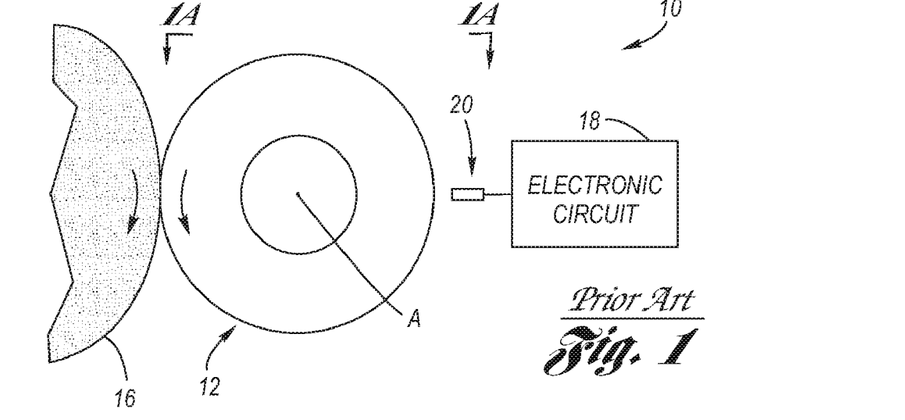
FIG. 1 is a plan schematic view of a tire runout detection apparatus known in the prior art.
Figure 1A:
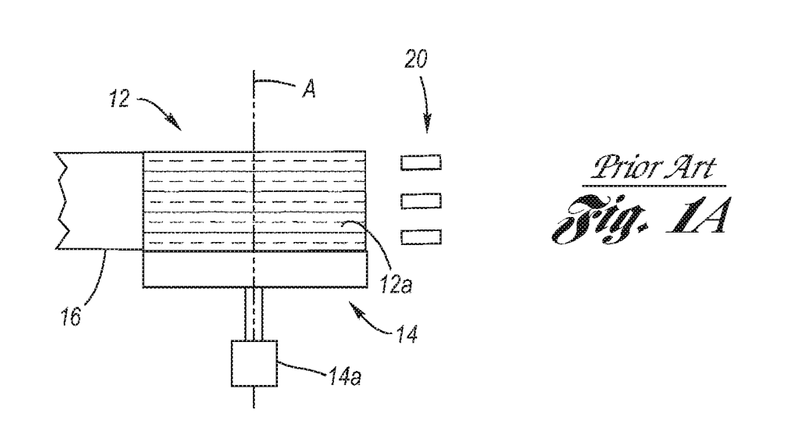
FIG. 1A is a side view, seen along line 1A-1A of FIG. 1.

Referring now to FIGS. 1 and 1A, the prior art tire runout detection apparatus 10 is schematically depicted. A tire 12 is placed onto a spindle 14 at which the tire spins about an axis A, wherein the spinning is induced by a motor 14a connected to the shaft of the spindle. A loading drum 16 is firmly pressed against the tread 12a of the tire 12, wherein the loading drum 16 may or may not be equipped with one or more force sensors (not shown) for sensing nonuniform tire variations. At least one runout detector 20 is disposed adjacent the tire tread 12a to detect either or both local and nonlocal runout of the tire. At least one runout detector provides a signal which is provided to an electronic circuit 18. The runout detector 20 may take a variety of forms: either contact types, such as for non-limiting example leaf contacts, potentiometers, and linear variable differential transformers (LVDTs); or non-contact types, such as for non-limiting example capacitive, optical (particularly laser displacement sensors and laser "fences"), etc.

Figure 1B:
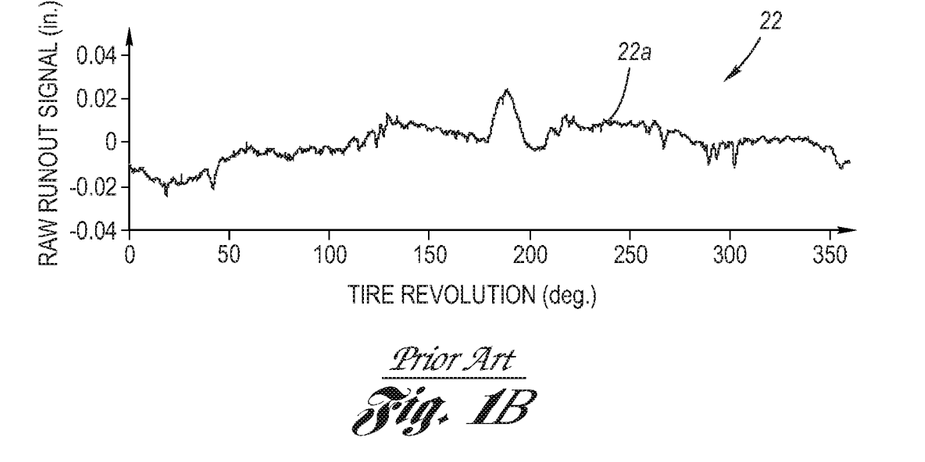
FIG. 1B is an example of a raw runout signal provided by the tire runout detection apparatus of FIG. 1.

The "raw" runout signal 22a typically produced by the at least one runout detector is represented at FIG. 1B, which is a graph 22 of raw runout (in inches) in relation to a normalized tire tread location of the tire versus circumferential (i.e., peripheral) location as a function of angular degrees of rotation of one tire revolution.

One technique used in the art to detect an objectionable runout is to measure peak-to-peak amplitude of the raw runout signal over a series of an angular degree range of tire rotation, the series completing a full tire rotation ("window peak-to-peak" method). Another technique used in the prior art is to measure non-local runout either using at least one runout detector 20 or a force sensor at the loading drum; however, this technique does not address local runout which can produce "helicopter noise".

Tire runout variation is rich in low tire order content, e.g., 1st to 5th tire orders, due to such imperfections as eccentricity and other long wavelength distortions arising from pre-cured natural manufacturing variations interacting with the relatively compliant pre-vulcanized green tire structure. This pre-vulcanized green tire structure, furthermore, will naturally react to even sharp irregularities with a distributed deformation causing adjacent surface area to likewise exhibit a deformation from the pre-distorted shape. This non-local runout comprises lower tire order contributions to the runout, and does not produce "helicopter noise".

With regard to the term "tire order", the "$1^{st}$ tire order" content is the term of a Fourier sine series representation of the periodic tire runout signal, whereby the wavelength of the recurrent full sinewave pattern is a complete revolution of the tire; higher tire order content exists with recurrent sinewave patterns over shorter wavelengths such that the $2^{nd}$ tire order occurs over ½ revolution, the $3^{rd}$ over ⅓ revolution, etc. Decomposition of the periodic waveforms into Fourier series representations is commonly practiced and is well known to those skilled in the art of periodic waveform analysis.

The challenge is devising a method which provides detection of higher tire order content, the local runout caused by sharp irregularities, in a raw runout signal which is "contaminated" by other lower tire order and non-contributory content to the local runout.

Figure 2A:
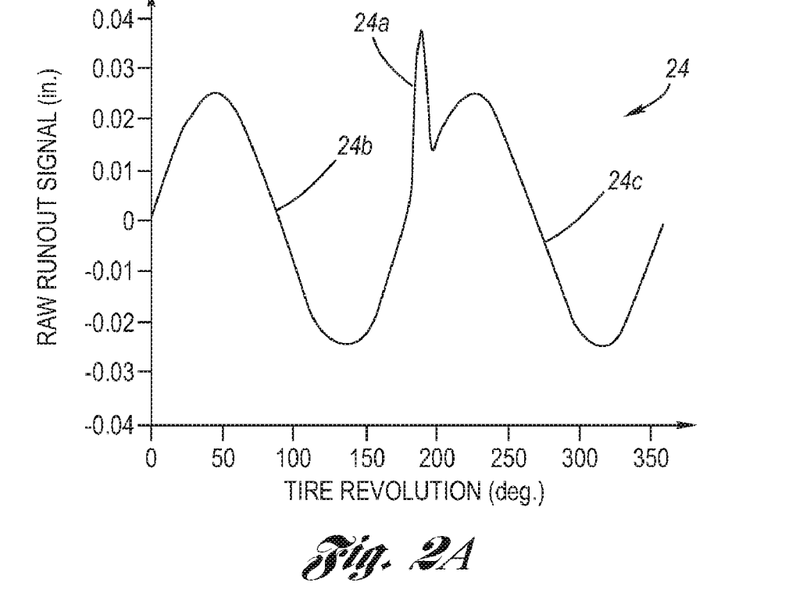
FIG. 2A is a plot of a first example of a raw runout signal in which a sharp irregularity runout produces an intense high tire order signal peak leading a low tire order positively directed signal peak.
Figure 2B:
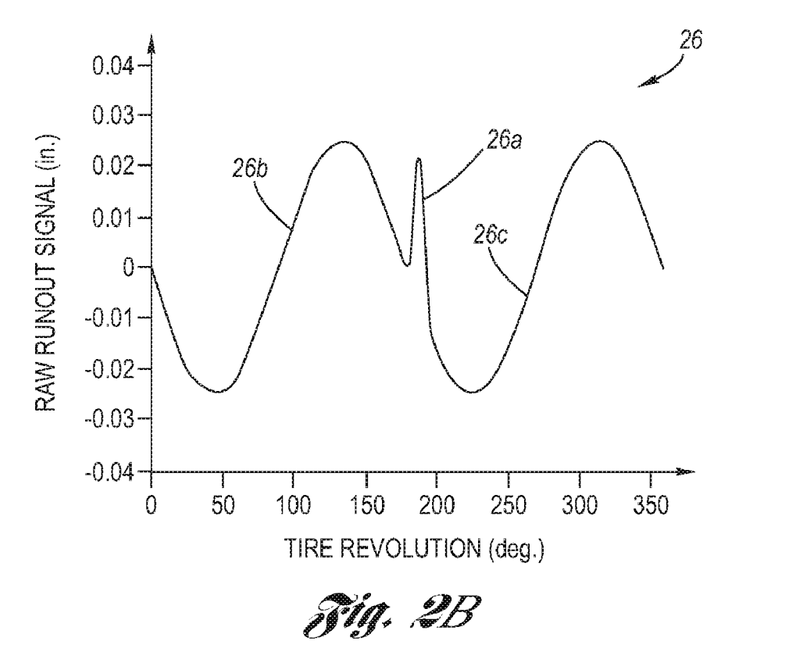
FIG. 2B is a plot of a second example of a raw runout signal in which a sharp irregularity runout produces an intense high tire order signal peak following a low tire order positively directed signal peak.

Turning attention now to FIGS. 2A and 2B, examples of the inability of the prior art runout detection techniques to detect objectionable "helicopter noise" are exemplified. At FIG. 2A, a first example of a simulated raw runout signal, plot 24, is depicted in which local runout due to a local sharp irregularity produces a narrow and intense, relatively high tire order signal 24a which is in leading disposition relative to a lower $2^{nd}$ tire order signal 24b comprising the raw runout signal 24c. At FIG. 2B, a second example of a simulated raw runout signal, plot 26, is depicted in which local runout also due to a sharp irregularity produces a narrow and intense high tire order signal 26a which is in following disposition relative to a lower $2^{nd}$ tire order signal 26b comprising the raw runout signal 26c.

At FIG. 2A, the prior art technique for detecting runout of the local type using the window peak-to-peak method of runout detection may falsely identify a tire as unacceptable (a false positive), as for example if runout over 0.03 inches was the threshold, even if the local runout causing the detection, i.e., the high tire order signal 24a, possessed a geometry that would not produce "helicopter noise". At FIG. 2B, the prior art technique for detecting runout of the local type using the window peak-to-peak method of runout detection may falsely identify a tire as acceptable (a false negative), as for example if runout over 0.03 inches was the threshold, even if the local runout that was not detected, i.e., the high tire order signal 26a, would produce "helicopter noise".

Figure 2C:
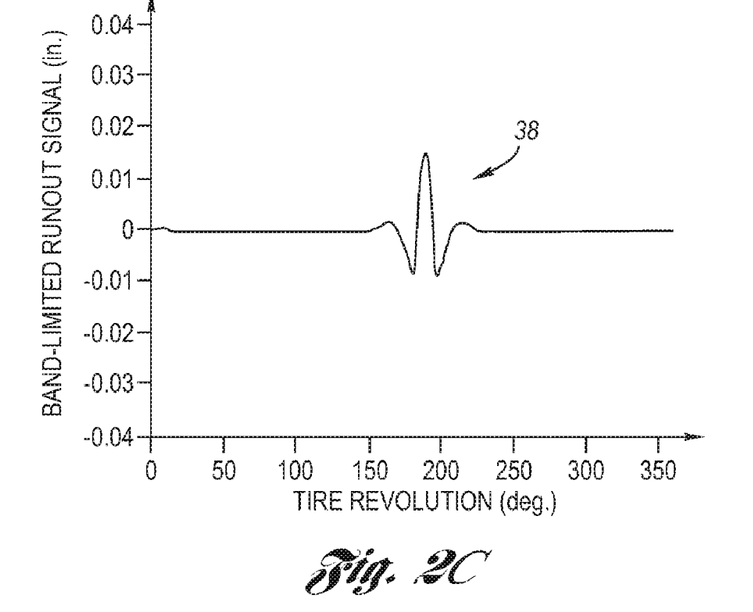
FIG. 2C is a plot exemplifying a typical band-limited runout signal associated with periodically modulated cabin interior sound during vehicle movement, usually driving conditions involving highway speeds and smooth roads, which is audibly detectable by passengers according to the method of the present invention of an arbitrary point of plot 36 of FIG. 2D.
Figure 2D:
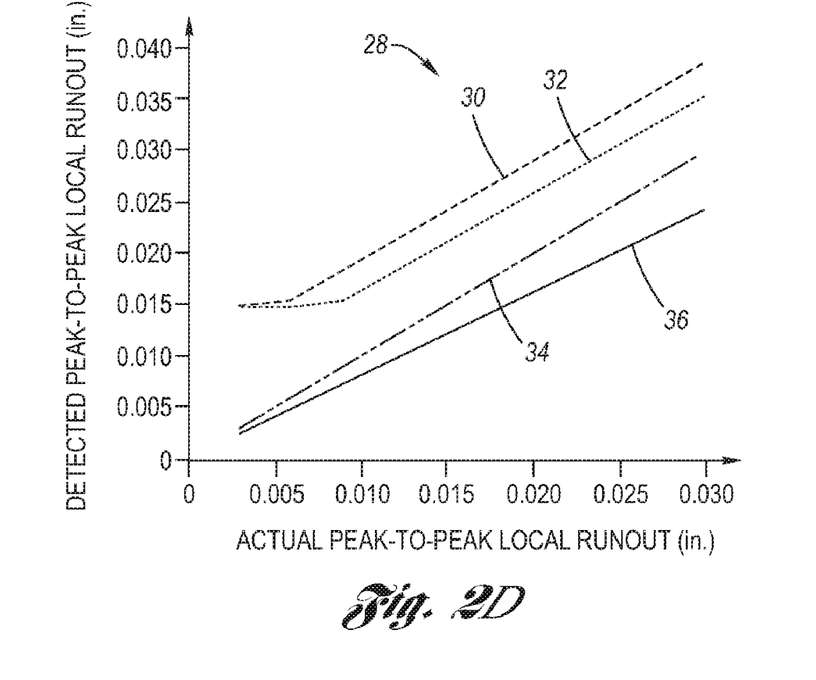
FIG. 2D is a graph comparing detection of simulated local runout of periodically modulated cabin interior sound during vehicle movement, usually driving conditions involving highway speeds and smooth roads, which is audibly detectable by passengers as measured or calculated for an ideal local runout detection, for local runout detection using the prior art techniques, and using the method according to the present invention.

Limitations of the prior art technique for detecting local runout using the window peak-to-peak method of runout detection where the local runout would produce "helicopter noise" are additionally illustrated as examples in FIG. 2D. FIG. 2D relates to runout of the type indicated at FIGS. 2A and 2B wherein, in FIG. 2D, the horizontal axis depicts the actual peak-to-peak amplitudes, or the true peak-to-peak amplitudes, of the underlying tire tread sharp irregularities causing the local runout and the vertical axis depicts peak-to-peak amplitudes of the underlying tire tread irregularities causing the local runout as measured or calculated for an ideal local runout detection, for local runout detection using the prior art techniques, or (as will be described hereinbelow) using the method according to the present invention.

Plot 34 of FIG. 2D displays results of the analysis of the runout detection applied on idealized simulated runouts of the type indicated in FIGS. 2A and 2B wherein various amplitudes of signal 24a and 26a were superimposed on the fixed amplitude $2^{nd}$ tire order signals 24b or 26b comprising simulated raw runout signals 24c and 26c, respectively.

Plot 30 of FIG. 2D represents runout detection using the prior art technique applied on a simulated runout of the type indicated in FIG. 2A wherein various amplitudes of signal 24a were superimposed on the fixed amplitude $2^{nd}$ tire order signal 24b comprising simulated raw runout signal 24c.

Plot 32 of FIG. 2D represents runout detection using the prior art technique applied on a simulated runout of the type indicated in FIG. 2B wherein various amplitudes of signal 26a were superimposed on the fixed amplitude $2^{nd}$ tire order signal 26b comprising simulated raw runout signal 26c.

Plot 36 pertains to the method of the present invention, which will be described later.

In FIG. 2D, a desirable detection should show a direct proportional response to that of the actual or true peak-to-peak amplitudes, i.e., a line that passes through the origin as exemplified by the ideal runout detection plot 34. A displaced line not passing through the origin, on the other hand, such as plot 30 or plot 32 implies tires having local runout that would produce a "helicopter noise" cannot be detected below a threshold level in the presence of contaminating content of the raw runout signal, and cannot detect proper magnitudes for tires with different characters of lower tire order content. As an example, for actual runout of 0.015", the prior art approach can provide a measured local runout anywhere between 0.015" to 0.023", depending on the presence of the lower tire order content in the raw runout signal. This undesirable ambiguous range, i.e., 0.015" to 0.023" in this example, of inferred local runout can also degrade further depending on the relative content of the local versus the lower tire order content of the runout.

Thus, the prior art window peak-to-peak runout detection method is limited by false positives (which results in unnecessary non-acceptance of otherwise acceptable tires) and false negatives (which results in acceptance of faulty tires) as well as limited detection capabilities of local runout that produce "helicopter noise".

Accordingly, what is needed in the art is some methodology which provides detection of the higher tire order content, the local runout caused by sharp irregularities, in a raw runout signal which is "contaminated" by other lower tire order and non-contributory content so that the detection is free of false positive and false negative determinations with respect to the generation of "helicopter noise" by the runout.

SUMMARY OF THE INVENTION

The present invention is a method to detect tires having local runout capable of generating "helicopter noise" by the use of bandpass filtering of the raw runout signal to provide a band-limited runout signal which is then examined to detect characteristic signal patterns indicative of local runout known to exhibit periodically modulated cabin interior sound during vehicle movement, usually driving conditions involving highway speeds and smooth roads, which is audibly detectable by passengers, whereby tires may be evaluated as objectionable or not objectionable in that the detection renders tire runout associated with the production of "helicopter noise" during vehicle movement clearly identifiable. Hence, the present invention may also be regarded as a method to detect tires free of local runout known to exhibit periodically modulated cabin interior sound during vehicle movement, usually driving conditions involving highway speeds and smooth roads, which is audibly detectable by passengers.

The method according to the present invention may include a preliminary aspect in which an empirical analysis of motor vehicle cabin acoustics is made in order to ascertain the frequency bandwidth, by which the bandpass of the bandpass filter in terms of the tire orders within the bandpass is determined, by techniques well known in the art, of predetermined periodically modulated cabin interior sound during vehicle movement, usually driving conditions involving highway speeds and smooth roads, which is audibly detectable by passengers wherein the maximum gain of the bandpass filter is, preferably, unity.

By way of example with respect to a particular vehicle type, a microphone may be utilized to sense the sound and deliver a signal to an amplifier, wherein a headphone connected to the amplifier allows subjective detection of the periodically modulating sound of a sharp irregularity of a tire known to produce "helicopter noise". A bandpass filter, preferably having a maximum gain of unity, connected with the amplifier is then adjusted to identify the low and high frequency corners or low and high frequency cutoff tire orders of the bandpass filter within which the audibly objectionable "helicopter noise" is occurring, thereby defining the bandpass of the bandpass filter in terms of the tire orders within the bandpass. By way of non-limiting example, an empirical analysis may determine that the $10^{th}$ through the $25^{th}$ tire orders are the tire orders which carry sharp irregularity runout induced periodically modulated cabin interior sound during vehicle movement, usually driving conditions involving highway speeds and smooth roads, which is audibly detectable by passengers and defines the bandpass of the bandpass filter in terms of the tire orders within the bandpass wherein the $10^{th}$ and $25^{th}$ tire orders define the low and high tire order corners, respectively, of the bandpass filter wherein the maximum gain of the bandpass filter is, preferably, unity.

The method according to the present invention takes a raw runout signal provided by a suitable tire runout detection apparatus, bandpass filters the raw runout signal utilizing appropriate, empirically determined, low and high tire order corners to determine the bandpass of the bandpass filter, wherein the maximum gain of the bandpass filter is, preferably unity, obtains a band-limited runout signal from the step of bandpass filtering, and then examines the band-limited runout signal to detect characteristic signal patterns indicative of local runout which is known to exhibit periodically modulated cabin interior sound during vehicle movement, usually driving conditions involving highway speeds and smooth roads, which is audibly detectable by passengers, whereby tires may be evaluated as objectionable if local runout associated with the production of "helicopter noise" is detected.

In a preferred form of the method according to the present invention, a Fourier Transform of the digitized analog raw runout signal is multiplied by the Fourier Transform representation of a bandpass filter, having a maximum gain of unity and incorporating the desired tire orders, after which an Inverse Fourier Transform is performed yielding a band-limited runout signal in the angle domain of one tire revolution which is then examined to detect characteristic signal patterns indicative of local sharp irregularity runout known to exhibit periodically modulated cabin interior sound during vehicle movement, usually driving conditions involving highway speeds and smooth roads, which is audibly detectable by passengers, whereby tires may be evaluated as objectionable if local runout associated with the production of "helicopter noise" is detected.

The bandpass filter according to the preferred form of the present invention is, preferably, a digital filter exemplified by an nth order Butterworth bandpass filter extending from mth through pth tire orders where, for example, n=3, m=10, and p=25 and, preferably, employs forward and reverse bandpass filtering thereby behaving as a zero phase filter in order to produce the least distorted band-limited runout signal possible. The forward and reverse bandpass filtering, or equivalent, occurring implicitly in the multiplication of the Fourier Transforms, produces a zero phase shifted band-limited runout signal and also doubles the filter order of the bandpass filter (i.e., from n to 2n).

Accordingly, it is an object of the present invention to provide a method to detect tires with local runout suggestive of the generation of "helicopter noise" by the use of bandpass filtering of the raw runout signal to provide a band-limited runout signal which is then examined to detect characteristic signal patterns indicative of local runout which is known to exhibit periodically modulated cabin interior sound during vehicle movement, usually driving conditions involving highway speeds and smooth roads, which is audibly detectable by passengers, whereby tires may be evaluated as objectionable or not objectionable with respect to the likelihood they will generate "helicopter noise" when rotating on a vehicle in that the detection renders local runout suggestive of "helicopter noise" clearly identifiable.

This and additional objects, features and advantages of the present invention will become clearer from the following specification of a preferred embodiment.

DESCRIPTION OF THE PREFERRED EMBODIMENT

Referring now to the Drawing, FIGS. 2C through 6 depict various aspects of a method according to the present invention to detect local runout of tires which is responsible for "helicopter noise".

FIG. 2C is a plot 38 exemplifying a typical band-limited runout signal associated with periodically modulated cabin interior sound during vehicle movement, usually driving conditions involving highway speeds and smooth roads, which is audibly detectable by passengers according to the method of the present invention of an arbitrary point of plot 36 of FIG. 2D.

Plot 36 of FIG. 2D represents the local runout detection applied on simulated runouts of the type indicated in FIGS. 2A and 2B wherein various amplitudes of local runout signals 24a and 26a were superimposed on the fixed amplitude $2^{nd}$ tire order signals 24b or 26b comprising simulated raw runout signals 24c and 26c, respectively, using the method according to the present invention. As previously mentioned, a desirable detection should show a direct proportional response to that of the actual or true peak-to-peak amplitudes of the local runout, i.e., a line that passes through the origin as exemplified by the ideal runout detection plot 34 or any line passing through the origin as is typical of the method according to the present invention. Plot 36 of FIG. 2D also passes through the origin exemplifying that the method according to the present invention has a direct proportional response to that of the actual or true peak-to-peak amplitudes and, thus, to the ideal runout detection plot 34. Therefore, the method according to the present invention is not limited by a threshold level and is unambiguous even with the contaminating content, as is typical of the method of the prior art, in the presence of contaminating content of the raw runout signal and can detect tires having local runout that would produce a "helicopter noise" above and below such a threshold level and in the presence of varying levels of low order tire runout content.

Figure 3:
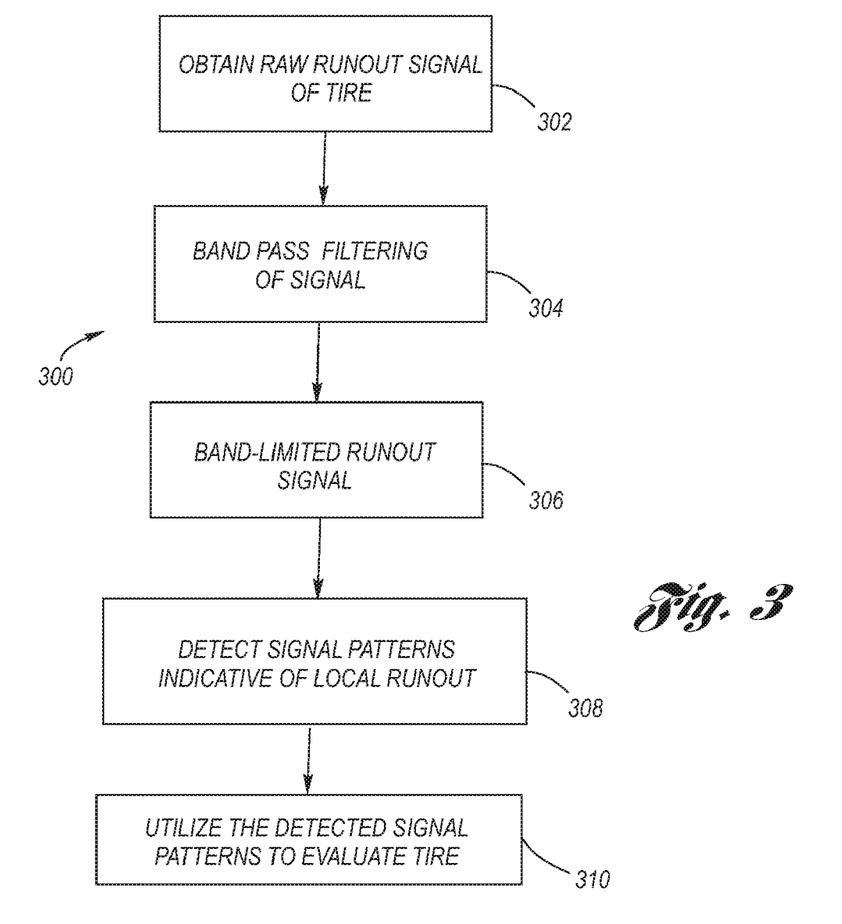
FIG. 3 is an algorithm for implementing the method according to the present invention.

FIG. 3 is an algorithm 300 for implementing the method according to the present invention. At Block 302, the raw runout signal is provided to algorithm 300 from, for example, the tire runout detection apparatus of FIG. 1 and is passed to Block 304.

At Block 304, the raw runout signal of Block 302 is bandpass filtered through a bandpass filter, wherein the maximum gain of the bandpass filter is, preferably, unity, utilizing appropriate, empirically determined, low and high tire order corners to determine the bandpass of the bandpass filter, to obtain a band-limited runout signal at Block 306.

The band-limited runout signal from Block 306 is then examined at Block 308 to detect characteristic signal patterns indicative of local runout which is known to exhibit periodically modulated cabin interior sound during vehicle movement, usually driving conditions involving highway speeds and smooth roads, which is audibly detectable by passengers based upon, for example, empirical analysis.

The detected characteristic signal patterns from Block 308 are utilized at Block 310 to evaluate tires as objectionable if the characteristic signal patterns indicative of local runout suggest periodically modulated cabin interior sound during vehicle movement, usually driving conditions involving highway speeds and smooth roads, which is audibly detectable by passengers or not objectionable if the characteristic signal patterns indicative of local runout do not suggest periodically modulated cabin interior sound during vehicle movement, usually driving conditions involving highway speeds and smooth roads, which is audibly detectable by passengers. By example, the detected characteristic feature could be the maximum peak-to-peak activity observed in the signal pattern. Comparison of this maximum peak-to-peak activity with a predetermined threshold could determine the likelihood of the tire to produce "helicopter noise" and hence, its acceptance or non-acceptance.

Figure 4:
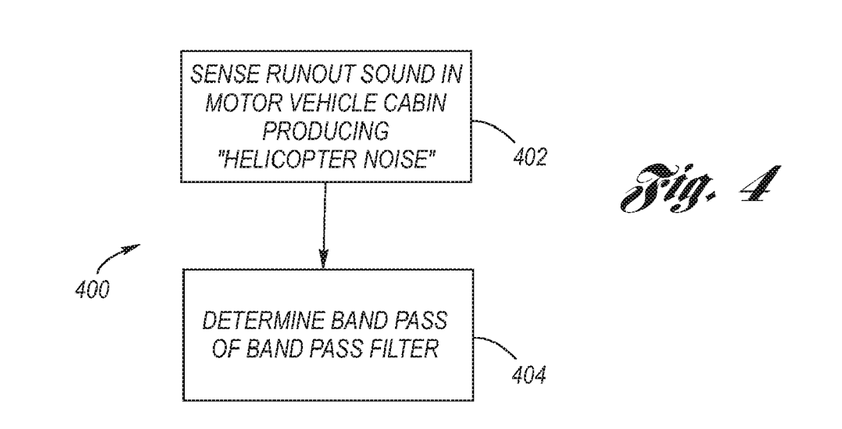
FIG. 4 is an algorithm of implementing an empirical analysis to provide a desired bandpass filter characteristic utilized in a preferred method of carrying out the present invention.

FIG. 4 is an algorithm 400 of implementing an empirical analysis to provide a desired bandpass filter characteristic utilized in a preferred method of carrying out the present invention.

At Block 402, runout sound is sensed in a motor vehicle cabin. By way of example with respect to a motor vehicle cabin of a particular vehicle type, a microphone may be utilized to sense the sound and deliver a signal to an amplifier, wherein a headphone connected to the amplifier allows subjective detection of the periodically modulating sound of a sharp irregularity of a tire known to produce "helicopter noise".

At Block 404, the runout sound of Block 402 is applied to a bandpass filter, having a maximum gain of, preferably, unity, connected with the amplifier and is then adjusted to identify the low and high tire order corners or low and high tire orders of the bandpass filter within which the audibly objectionable "helicopter noise" is occurring, thereby defining the bandpass of the bandpass filter in terms of the tire orders within the bandpass. By way of non-limiting example, an empirical analysis may determine that the $10^{th}$ through the $25^{th}$ tire orders are the tire orders which carry sharp irregularity runout induced periodically modulated cabin interior sound during vehicle movement, usually driving conditions involving highway speeds and smooth roads, which is audibly detectable by passengers and defines the bandpass of the bandpass filter in terms of the tire orders within the bandpass wherein the $10^{th}$ and $25^{th}$ tire orders define the low and high tire order corners, respectively, of the bandpass filter wherein the maximum gain of the bandpass filter is, preferably, unity.

Figure 5:
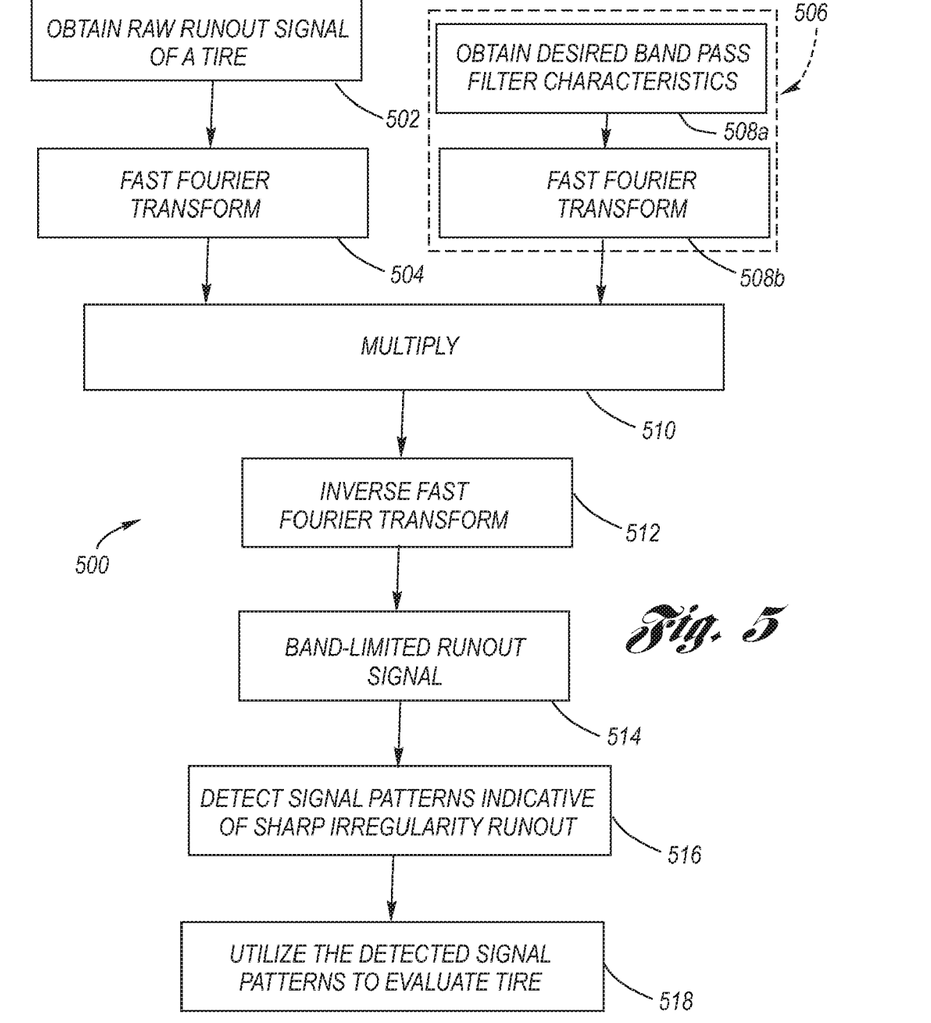
FIG. 5 is a preferred algorithm for carrying out the method according to the present invention.

FIG. 5 is a preferred algorithm 500 for carrying out the method according to the present invention. An analog raw runout signal, for example signal 22a of FIG. 1B, is provided to Block 502 by a tire runout detection apparatus as exemplified by FIGS. 1 and 1A. At Block 504, a Fourier Transform of the digitized analog signal of Block 502 is produced by techniques well known in the art. In this regard, application of Fourier Transforms (FT) and Inverse Fourier Transforms (IFT) involve methodologies commonly employing Discrete Fourier Transforms (DFT) and Fast Fourier Transforms (FFT), as non-limiting examples, and are well known to the skilled practitioner. By example, the detected characteristic feature could be the maximum peak-to-peak activity observed in the signal pattern. Comparison of this maximum peak-to-peak activity with a predetermined threshold could determine the likelihood of the tire to produce "helicopter noise" and hence, its acceptance or non-acceptance.

At Block 506, the desired bandpass filter characteristics are determined, as previously described, for a preferred filter according to the present invention. These characteristics include, but are not limited to, a digital filter exemplified by a digital Butterworth bandpass filter of nth filter order, for example $3^{rd}$ filter order, having a bandpass extending from mth through pth tire orders, for example $10^{th}$ through $25^{th}$ tire orders, wherein the $10^{th}$ and $25^{th}$ tire orders define the low and high tire order corners, respectively, of the bandpass filter wherein the maximum gain of the bandpass filter is, preferably, unity.

The implementation of the results of Block 506 in the tire order domain produce Block 508 which represents the Fourier Transform (FT) of the desired bandpass filter of Block 506.

At Block 510, the FT of block 504 and the FT of Block 508 are multiplied in order to produce the least distorted band-limited runout signal possible in Block 514. The bandpass filtering occurring in Block 510 produces a zero phase shifted band-limited runout signal in the tire order domain and doubles the filter order of the bandpass filter (i.e., from $3^{rd}$ filter order to $6^{th}$ filter order). An Inverse Fourier Transform (IFT) on the output of Block 510 is performed at Block 512 resulting in the band-limited runout signal at Block 514 as exemplified by signal 602 of FIG. 6.

At Block 516, the band-limited runout signal at Block 514 is examined for characteristic signal patterns that renders clearly identifiable local runout known to exhibit "helicopter noise", that is, periodically modulated cabin interior sound during vehicle movement, usually driving conditions involving highway speeds and smooth roads, which is audibly detectable by passengers.

The detected characteristic signal patterns from Block 516 are utilized at Block 518 to evaluate tires as objectionable if the characteristic signal patterns indicative of local runout suggest "helicopter noise", that is, suggest periodically modulated cabin interior sound during vehicle movement, usually driving conditions involving highway speeds and smooth roads, which is audibly detectable by passengers or not objectionable if the characteristic signal patterns indicative of local runout do not suggest "helicopter noise".

Figure 6:
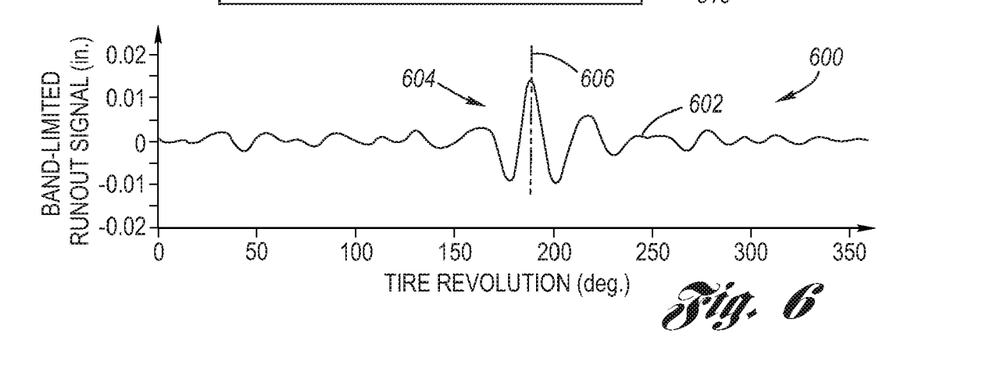
FIG. 6 is a plot of the band-limited runout signal according to the present invention provided by the algorithm of FIG. 5, wherein a runout signal characteristic, similar to that shown at FIG. 2C, of periodically modulated cabin interior sound during vehicle movement, usually driving conditions involving highway speeds and smooth roads, which is audibly detectable by passengers is identifiable.

FIG. 6 is a plot 600 of an example of a band-limited runout signal 602 according to the present invention provided by Block 514 of the algorithm of FIG. 5, wherein a runout signal characteristic 604, similar to that shown at FIG. 2C, suggestive of "helicopter noise", that is, periodically modulated cabin interior sound during vehicle movement, usually driving conditions involving highway speeds and smooth roads, which is audibly detectable by passengers is identifiable. The approximately mirrored appearance of the band-limited runout signal 602 about line 606 is due to the utilization of a zero phase filter in FIG. 5 but would not be the case if a non-zero phase filter is utilized.

To those skilled in the art to which this invention appertains, the above described preferred embodiment may be subject to change or modification. Such change or modification can be carried out without departing from the scope of the invention, which is intended to be limited only by the scope of the appended claims.

The invention claimed is:

1. A method for detecting local runout of a tire, comprising the steps of:
   obtaining a raw runout signal of the tire;
   bandpass filtering the raw runout signal to provide a band-limited runout signal; and
   detecting patterns of the band-limited runout signal indicative of local runout.

2. The method of claim 1, wherein said step of detecting comprises:
  detecting maximum peak-to-peak activity in the band-limited runout signal;
  comparing the maximum peak-to-peak activity with respect to a predetermined threshold to thereby detect whether the tire has local runout; and
  determining whether the tire is acceptable responsive to said step of comparing.

3. The method of claim 1, wherein said step of bandpass filtering comprises:
  obtaining a sound signal of sound produced by local runout during rotation of a selected tire on a surface; and
  obtaining a bandpass filter characteristic comprising determining a bandpass of a bandpass filter of the sound signal, wherein the bandpass comprises a low tire order corner and a high tire order corner of the sound signal having a predetermined gain.

4. The method of claim 3, wherein the sound comprises "helicopter noise" defined as periodically modulated cabin interior sound produced by local runout of the selected tire during an equivalent of movement of a motor vehicle during predetermined driving conditions which is audibly detectable by an equivalent of a passenger in the cabin.

5. The method of claim 4, wherein said step of detecting comprises:
  detecting maximum peak-to-peak activity in the band-limited runout signal;
  comparing the maximum peak-to-peak activity with respect to a predetermined threshold to thereby detect whether the tire has local runout which may produce the "helicopter noise"; and
  determining whether the tire is acceptable responsive to said step of comparing.

6. The method of claim 4, wherein said step of bandpass filtering further comprises:
  performing a Fourier Transform of the raw runout signal;
  multiplying the Fourier transformed runout signal by a Fourier Transform equivalent of the bandpass filter characteristic; and
  performing an Inverse Fourier Transform of the result of said step of multiplying to thereby obtain a band-limited runout signal utilized in said step of detecting.

7. The method of claim 6, further comprising determining whether the tire has local runout which produces the "helicopter noise".

8. The method of claim 6, wherein said step of obtaining a bandpass filter characteristic uses a bandpass filter comprising a digital filter employing an equivalent of forward and reverse bandpass filtering and behaving as a zero phase filter, wherein the band-limited runout signal is zero phase shifted.

9. The method of claim 8, wherein said step of detecting comprises:
  detecting maximum peak-to-peak activity in the band-limited runout signal;
  comparing the maximum peak-to-peak activity with respect to a predetermined threshold to thereby detect whether the tire has local runout which may produce the "helicopter noise"; and
  determining whether the tire is acceptable responsive to said step of comparing.

10. The method of claim 8, wherein in said step of obtaining a bandpass filter characteristic, the low tire order corner is substantially the 10th tire order and the high tire order corner is substantially the 25th tire order.

11. The method of claim 10, further comprising determining whether the tire has local runout which produces the "helicopter noise".

12. The method of claim 10, wherein said step of obtaining a bandpass filter characteristic uses an nth filter order Butterworth bandpass filter.

13. The method of claim 12, wherein said step of detecting comprises:
  detecting maximum peak-to-peak activity in the band-limited runout signal;
  comparing the maximum peak-to-peak activity with respect to a predetermined threshold to thereby detect whether the tire has local runout which may produce the "helicopter noise"; and
  determining whether the tire is acceptable responsive to said step of comparing.

14. A method for detecting local runout of a tire, comprising the steps of:
  obtaining a raw runout signal of the tire;
  bandpass filtering the raw runout signal to provide a band-limited runout signal, said step of bandpass filtering comprising:
    obtaining a sound signal of sound produced by local runout during rotation of a selected tire on a surface;
    obtaining a bandpass filter characteristic comprising determining a bandpass of a bandpass filter of the sound signal, wherein the bandpass comprises a low tire order corner and a high tire order corner of the sound signal having a predetermined gain;
    performing a Fourier Transform of the raw runout signal;
    multiplying the Fourier Transformed runout signal by a Fourier Transform equivalent of the bandpass filter characteristic; and
    performing an Inverse Fourier Transform of the result of said step of multiplying to thereby obtain the band-limited runout signal;
  detecting patterns of the signal indicative of local runout, wherein said step of detecting comprises:
    detecting maximum peak-to-peak activity in the band-limited runout signal;
    comparing the maximum peak-to-peak activity with respect to a predetermined threshold to thereby detect whether the tire has local runout; and
    determining whether the tire is acceptable responsive to said step of comparing.

15. The method of claim 14, wherein:
  in said step of obtaining a sound signal, the sound comprises "helicopter noise" defined as periodically modulated cabin interior sound produced by local runout of the selected tire during an equivalent of movement of a motor vehicle during predetermined driving conditions which is audibly detectable by an equivalent of a passenger in the cabin; and
  in said step of obtaining a bandpass filter characteristic, the low tire order corner is substantially the 10th tire order and the high tire order corner is substantially the 25th tire order.

16. A method for detecting local runout of a tire, comprising the steps of:
  obtaining a raw runout signal of the tire;
  bandpass filtering the raw runout signal to provide a band-limited runout signal, said step of bandpass filtering comprising:
    obtaining a sound signal of sound produced by local runout during rotation of a selected tire on a surface, wherein the sound comprises "helicopter noise"

defined as periodically modulated cabin interior sound produced by local runout of the selected tire during an equivalent of movement of a motor vehicle during predetermined driving conditions which is audibly detectable by an equivalent of a passenger in the cabin; and obtaining a bandpass filter characteristic comprising determining a bandpass of a bandpass filter of the sound signal, wherein the bandpass comprises a low tire order corner and a high tire order corner of the sound signal having a predetermined gain;

detecting patterns of the signal indicative of local runout, wherein said step of detecting comprises:

detecting maximum peak-to-peak activity in the band-limited runout signal;

comparing the maximum peak-to-peak activity with respect to a predetermined threshold to thereby detect whether the tire has local runout which may produce the "helicopter noise"; and determining whether the tire is acceptable responsive to said step of comparing.

17. The method of claim 16, wherein said step of bandpass filtering further comprises:

performing a Fourier Transform of the raw runout signal;

multiplying the Fourier Transformed runout signal by a Fourier Transform equivalent of the bandpass filter characteristic; and performing an Inverse Fourier Transform of the result of said step of multiplying to thereby obtain a band-limited runout signal utilized in said step of detecting.

18. The method of claim 17, wherein said step of obtaining a bandpass filter characteristic uses a bandpass filter comprising a digital filter employing an equivalent of forward and reverse bandpass filtering and behaving as a zero phase filter, wherein the band-limited runout signal is zero phase shifted.

19. The method of claim 18, wherein in said step of obtaining a bandpass filter characteristic, the low tire order corner is substantially the 10th tire order and the high tire order corner is substantially the 25th tire order.

20. The method of claim 19, wherein said step of obtaining a bandpass filter characteristic uses an nth filter order Butterworth bandpass filter.

* * * * *